Sept. 2, 1969　　　　G. O. BAKER　　　　3,464,386

TROPICAL FISH FEEDING DEVICE

Filed March 29, 1967

INVENTOR.
Glenn O. Baker

United States Patent Office 3,464,386
Patented Sept. 2, 1969

3,464,386
TROPICAL FISH FEEDING DEVICE
Glenn O. Baker, 1224 N. Home Road, R.D. 3,
Mansfield, Ohio 44903
Filed Mar. 29, 1967, Ser. No. 626,889
Int. Cl. A01k *61/02*
U.S. Cl. 119—5    1 Claim

ABSTRACT OF THE DISCLOSURE

A fish feeder with telescoping sleeves to adjust for the height of an aquarium with an inner and outer cone which will spread the feed as it descends to the lower extremity of the feeder and a base which is held down by the gravel within the aquarium. The feeder allows the food to be evenly spread within the bowl of the lower extremity and prevents contamination of the aquarium by spoiled food.

---

Figure 1:
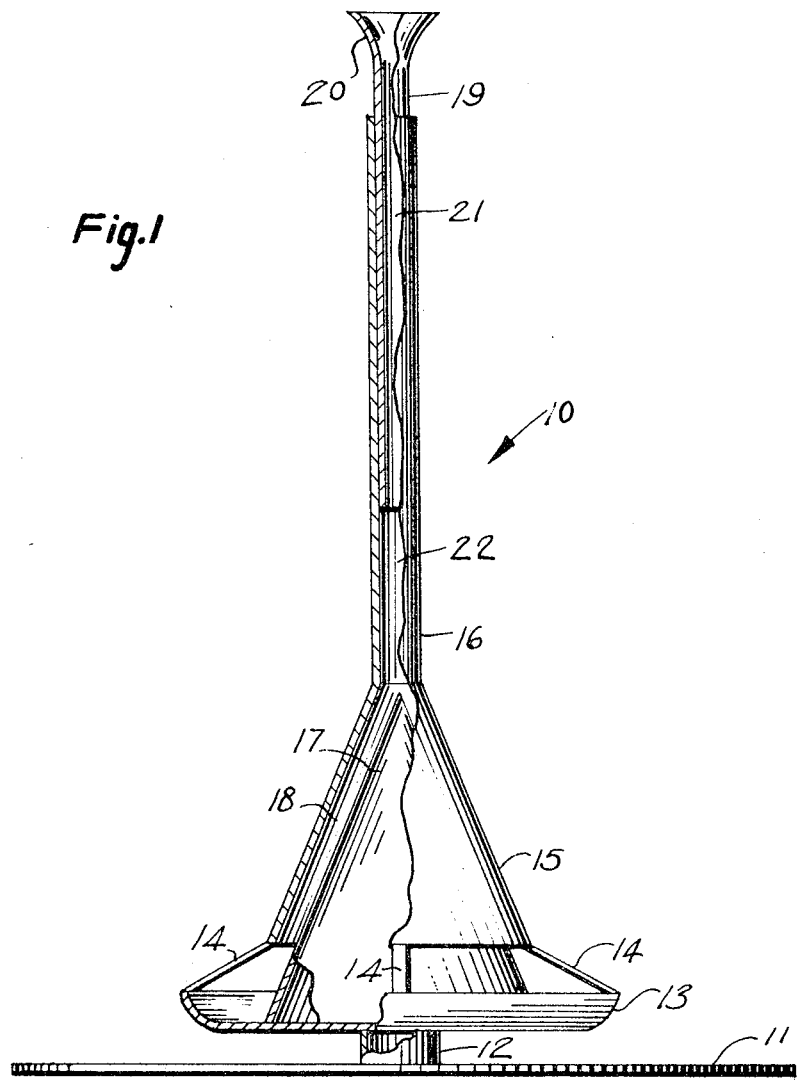

This invention relates to feeders and more particularly to a feeding device for tropical fish and the like.

It is therefore the main purpose of this invention to provide a tropical fish feeding device which will keep the food in one area so that it will not accumulate on the bottom of the aquarium.

Another object of this invention is to provide a tropical fish feeder which will keep the food from deteriorating and causing contamination and foul odors within the aquarium.

Still another object of this invention is to provide a tropical fish feeding device which will not only keep the aquarium tank cleaner for a longer period of time, but will also allow tropical fish lovers to easily observe the fish as they congregate to feed in one location.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

Figure 2:
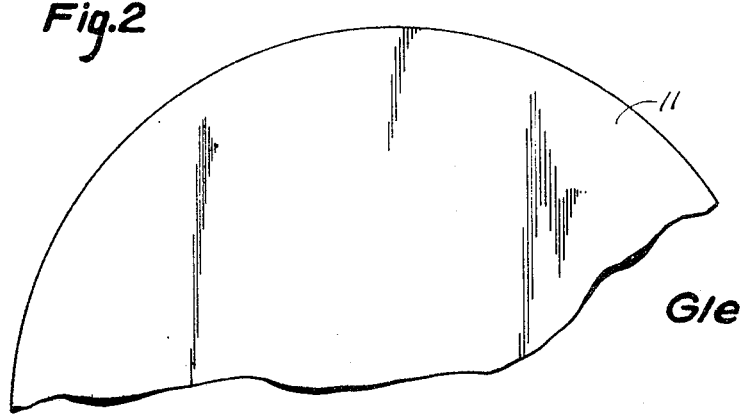

In the drawing:

FIGURE 1 is a vertical view of the invention shown in elevation and partly broken away; and FIGURE 2 is a fragmentary bottom plan view of FIGURE 1.

According to this invention, a tropical fish feeding device 10 is provided with a flat circular disc base 11 which may be covered with gravel on the bottom of the aquarium in order for the device 10 to remain upright. Attached to and extending upwards from base 11 is a hollow cylinder 12 providing spacer means between the base 11 and a bowl 13. A plurality of radially and equally spaced apart braces 14 are secured to the outer edge of bowl 13 and are secured to a hollow conical member 15. Conical member 15 is provided with an elongated extending sleeve 16 for a purpose which hereinafter will be described. A hollow conical member 17 is fixedly secured within bowl 13 and extends upwards within conical member 15. A space 18 between conical member 15 and conical member 17 provided passageway for gravity descending tropical fish food. An elongated sleeve 19 is provided with a flaired end 20 at its upper extremity for easily receiving tropical fish food and sleeve 19 is telescopingly received within sleeve 16 thus providing adjustment means for the height of device 10 within different aquariums.

In use, food is placed or shaken into the flared end 20 of sleeve 19 where upon it descends downwards through bore 21 of sleeve 19. After leaving sleeve 19 the food then descends into the bore 22 of sleeve 16 whereupon at the apex of the conical member 17 the tropical fish food is distributed by itself substantially evenly within the space 18 until it collects around the bottom of the bowl 13 whereupon the fish will gather and feed from the bowl 13.

It will be noted that the material tropical fish feeding device 10 is constructed of, may be plastic, ceramic, glass or so on and the device may be molded or so constructed of a plurality of members and any of the changes made will not depart from the scope of the invention.

What I now claim is:

1. A tropical fish feeding device for tropical fish aquariums, comprising in combination, a circular disc support member providing a hold down base for said device, an upstanding support cylinder secured upon said base, a bowl member for collectively receiving food particles being mounted upon said cylinder, a pair of hollow conical food distributing members, and a pair of telescoping sleeve food supply members providing height adjustment means for said device, said cylindrical support member providing a space between the bottom of said bowl, and the top of said base for the placement of gravel on said base within said aquarium in order to stabilize said device in an upward position within said aquarium, a first of said hollow conical members being secured in an inverted position upon said bowl, and a second of said conical members being positioned in spaced relation over said first conical member, said conical members being equally tapered to a point so to form a uniform space therebetween throughout the length, a lower edge of said second conical member being supported upon a plurality of radially extending, spaced apart bases, said bases being secured upon a peripheral edge of said bowl, and the upper end of the conical member being secured to a lower end of one of said telescoping sleeve members, the other of said sleeve members being slidably received in the upper end of the first said sleeve member, the second said telescoping sleeve member having an upper end which is outwardly flared, said sleeve members being telescopic relative to each other in order to be adapted for aquariums of various depths.

References Cited

UNITED STATES PATENTS

| 1,976,962 | 10/1934 | Pape | 119—3 X |
| 2,718,211 | 9/1955 | Pettas | 119—5 X |
| 3,012,539 | 12/1961 | Warren | 119—52 X |
| 3,033,163 | 5/1962 | Hoestetler et al. | 119—52 |
| 3,105,463 | 10/1963 | Pilch | 119—52 |
| 3,326,184 | 6/1967 | Greenbaum | 119—5 |

ALDRICH F. MEDBERY, Primary Examiner

U.S. Cl. X.R.

119—3